United States Patent [19]

Huston et al.

[11] Patent Number: 4,865,488

[45] Date of Patent: Sep. 12, 1989

[54] METHOD AND APPARATUS FOR DISPOSING OF ASBESTOS-CONTAINING MATERIAL

[76] Inventors: Duane A. Huston, 1222 Linwood Ave.; Elon J. Daugherty, 3012 Ferrand La., both of El Dorado, Ark. 71730

[21] Appl. No.: 281,075

[22] Filed: Dec. 8, 1988

[51] Int. Cl.$^4$ ............................................... B09B 1/00
[52] U.S. Cl. .................................... 405/129; 405/128; 405/258
[58] Field of Search ............... 405/128, 129, 258, 267, 405/264, 263; 241/4; 423/DIG. 18; 210/728, 747, 902; 106/900

[56] References Cited

U.S. PATENT DOCUMENTS

| | | |
|---|---|---|
| 3,204,019 | 8/1965 | Schulze . |
| 3,271,186 | 9/1966 | Sadler et al. . |
| 3,675,393 | 7/1972 | Meade . |
| 3,914,079 | 10/1975 | Kober . |
| 4,190,456 | 2/1980 | Absolon et al. . |
| 4,289,624 | 9/1981 | Golczewski et al. ................ 210/404 |
| 4,532,113 | 7/1985 | Chao et al. ..................... 405/129 X |
| 4,541,846 | 9/1985 | Sjodin . |
| 4,652,404 | 3/1987 | Mallek .................................. 252/628 |
| 4,676,811 | 6/1987 | Wade . |
| 4,705,429 | 11/1987 | Natale ................................... 405/128 |
| 4,718,925 | 1/1988 | DeMarco .............................. 55/367 |
| 4,723,969 | 2/1988 | DeMarco ................................ 55/97 |
| 4,741,776 | 5/1988 | Bye et al. ........................ 405/129 X |

FOREIGN PATENT DOCUMENTS 0246106 11/1987 European Pat. Off. .
567699 8/1977 U.S.S.R. .

OTHER PUBLICATIONS

"You're Writing Specs, Not A Novel . . . ", 1-page Advertisement of Vacuum Engineering Corp.
"We Know What it Takes . . . ", 1-page Advertisement of GUZZLER Manufacturing, Inc.

Primary Examiner—Dennis L. Taylor
Attorney, Agent, or Firm—Cushman, Darby & Cushman

[57] ABSTRACT

The present invention relates to a mobile system for vacuum-conveying ACM or other material, hazardous or non-hazardous, from its point of removal to a self-propelled mixer where the ACM or other conveyed material is converted into a water slurry utilizing spent or contaminated scrubber solution. Then portland cement and sand, as needed, is added to form a cementatious mass which can be cast into blocks which are non-hazardous and which can be used for riverbank stabilization or to make artificial reefs. The mass can also be cast into a prepared hole for semi-permanent storage either on the owner's property or in a suitable landfill.

34 Claims, 5 Drawing Sheets

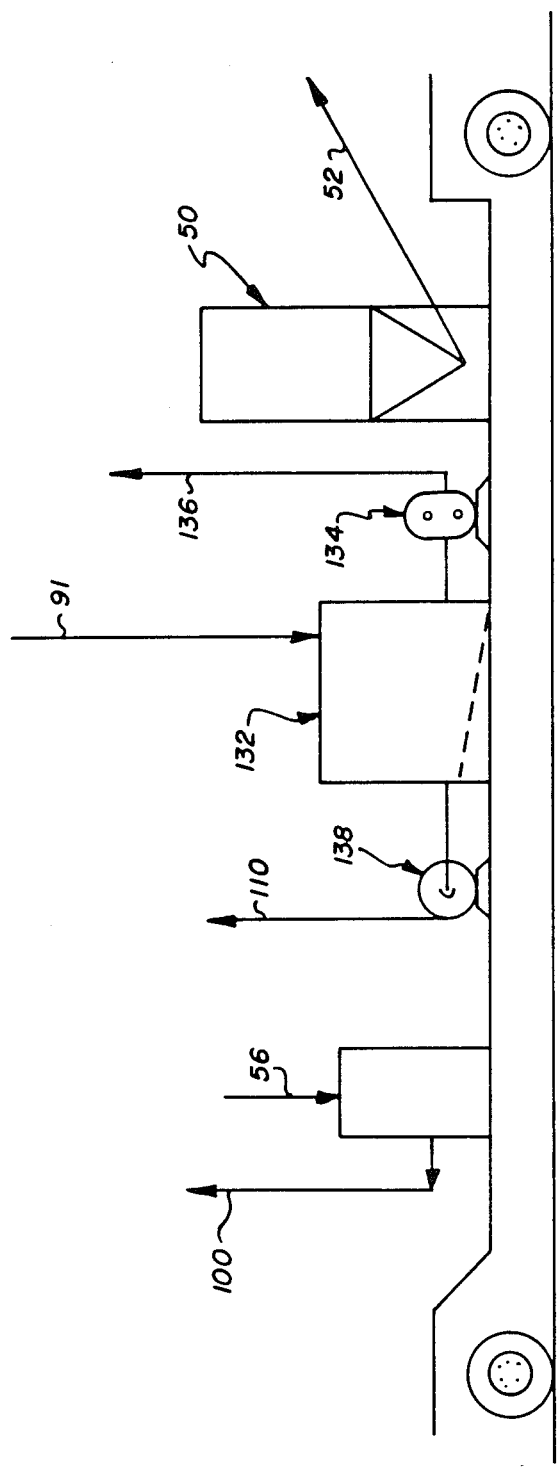

METHOD AND APPARATUS FOR DISPOSING OF ASBESTOS-CONTAINING MATERIAL

BACKGROUND OF THE INVENTION

From prior to the turn of the twentieth century until about 1980, asbestos was commonly used as insulation in a variety of applications. Now that it is well known that asbestos fibers are carcinogenic, government regulations and the threat of liability litigation has fueled a trend to cause the removal and safe disposal of this asbestos.

The present inventors are aware of three commercially available systems which have some similarities with the system provided by the present invention. In these prior art systems, which are similar to one another, the asbestos contaminated material ("ACM") is vacuum-conveyed to a separator, the conveying air is cleaned using a pulsed baghouse plus HEPA filters and the air is blown using a Roots Blower. The separated ACM falls into a bag through some type of activated valve. The ACM is disposed of using conventional methods, i.e. burial in 2-6 mil polyethylene bags in a landfill.

Conventional asbestos removal operations result in the ACM being placed into polyethylene plastic bags for transportation and disposal. The plastic bags of ACM must be manually removed from the abatement containment, manually transported to the disposal container or vehicle, manually loaded into the container or vehicle, and manually unloaded at the disposal site. The aforedescribed operation is very labor intensive and therefore expensive. In addition to the expense involved, experience has shown that a certain number of bags containing ACM will rupture or otherwise be opened allowing ACM to spill and cause potential exposure. Several attempts have been made to mechanize this materials-handling operation. Unfortunately, all of these systems exhibit severe defects in actual operation. Consequently, there existed a need for a solution to this problem.

SUMMARY OF THE INVENTION

The present invention provides a process for disposing of asbestos-containing material ("ACM"), which, in its preferred form, includes:
(a) shredding the ACM;
(b) introducing the shredded ACM into a concrete mixer truck using a pneumatic conveyor;
(c) using an air-water contact system to clean the air used in the pneumatic conveyor, while using the water that cleaned the air as input to the concrete mixer truck to make a slurry in the truck out of the ACM; and
(d) trucking the ACM slurry to a landfill, adding portland cement to the slurry and pumping it into the landfill and letting it harden into a block of asbestos-laden cement.

The present invention relates to a mobile system for vacuum-conveying ACM or other material, hazardous or non-hazardous, from its point of removal to a self-propelled mixer where the ACM or other conveyed material is converted into a water slurry utilizing spent or contaminated scrubber solution. Then portland cement and sand, as needed, is added to form a cementatious mass which can be cast into blocks which are non-hazardous and which can be used for riverbank stabilization or to make artificial reefs. The mass can also be cast into a prepared hole for semi-permanent storage either on the owner's property or in a suitable landfill.

The air conveying air discharged from the cyclone on the mobile unit contains less than 1% of the original ACM and is directed through three stages of wet scrubbing wherein a water ethylene-glycol, ethylene-glycol monobutylether mixture is used to remove substantially all of the particulate matter from the air stream.

The relatively clean/moist air conveying air is then directed through a turbine type of vacuum pump which serves two functions. First, it provides the motive force (i.e., vacuum) for the vacuum-conveying operations. Second, it heats the air conveying air sufficiently to insure that all of the moisture is converted into absorbable water vapor which will not damage the final filters which follow.

In the final step of the operation, the now relatively dry/clean air conveying air is drawn by the exhaust blower through primary, secondary and ultimately high efficiency particulate air (HEPA) filters and is discharged to the atmosphere.

Although, as stated above, the process of the present invention has some similarities with three commercially available systems in the prior art, the process of the present invention, in preferred practices of it, also has some important differences, including:

1. Slurry disposal vs. bag disposal polyethylene bags results in an 80-90 % reduction in the volume of material for ultimate disposal. By mixing the slurry with cement, the ACM is converted to a non-friable solid block. Disposal in this condition eliminates the potential for future exposure of personnel due to inadvertent digging or drilling in the landfills. Also, removal directly to slurry allows easier handling of chicken wire, metal lath, bolts, etc. These items tend to cut the poly bags when being filled, thus allowing fiber release.

2. Continuous vs. cyclical operation

The prior art units described above are all cyclical because of the bagging operation. Some have to be completely shut down each time a bag has to be changed. Their capacity is still limited by the personnel handling the bags for filling. The preferred apparatus of the present invention is a continuous processing unit which eliminates the need for personnel to handle the ACM once it is fed to the shredder. The continuous operation results in an order of magnitude higher process capacity.

3. Safer Air Cleaning Design

The prior art units use a bag house for primary filtering of the conveying air followed by HEPA filters. Due to the potential for failure of a bag and thus high levels of exposure to asbestos, the present inventors have chosen to use much more reliable air scrubbers for primary cleaning of the air. Testing to date of material accumulated in the secondary filters of the unit of the present invention indicates that no asbestos fibers pass through the scrubbers. Calcium silicate and other binder materials are the only materials found to pass through the scrubbers.

4. Hot/Dry Removal

There are situations which arise that simply do not lend themselves to the use of wet removal techniques or where the use of amended water is not acceptable. The NESHAPS regulations, 40 CFR 61.47(c)(1), allow for hot/dry removal if done properly. By eliminating the use of polyethylene bags and by direct conversion to slurry the unit of the present invention can be used successfully for removal of hot/dry asbestos materials.

An object of the invention is to provide a safer means of transporting a hazardous or non-hazardous material from the point of removal (in situ) to a disposal vehicle or site.

The principles of the invention will be further discussed with reference to the drawing wherein a preferred embodiment is shown. The specifics illustrated in the drawing are intended to exemplify, rather than limit, aspects of the invention as defined in the claims.

DETAILED DESCRIPTION

Figure 1:
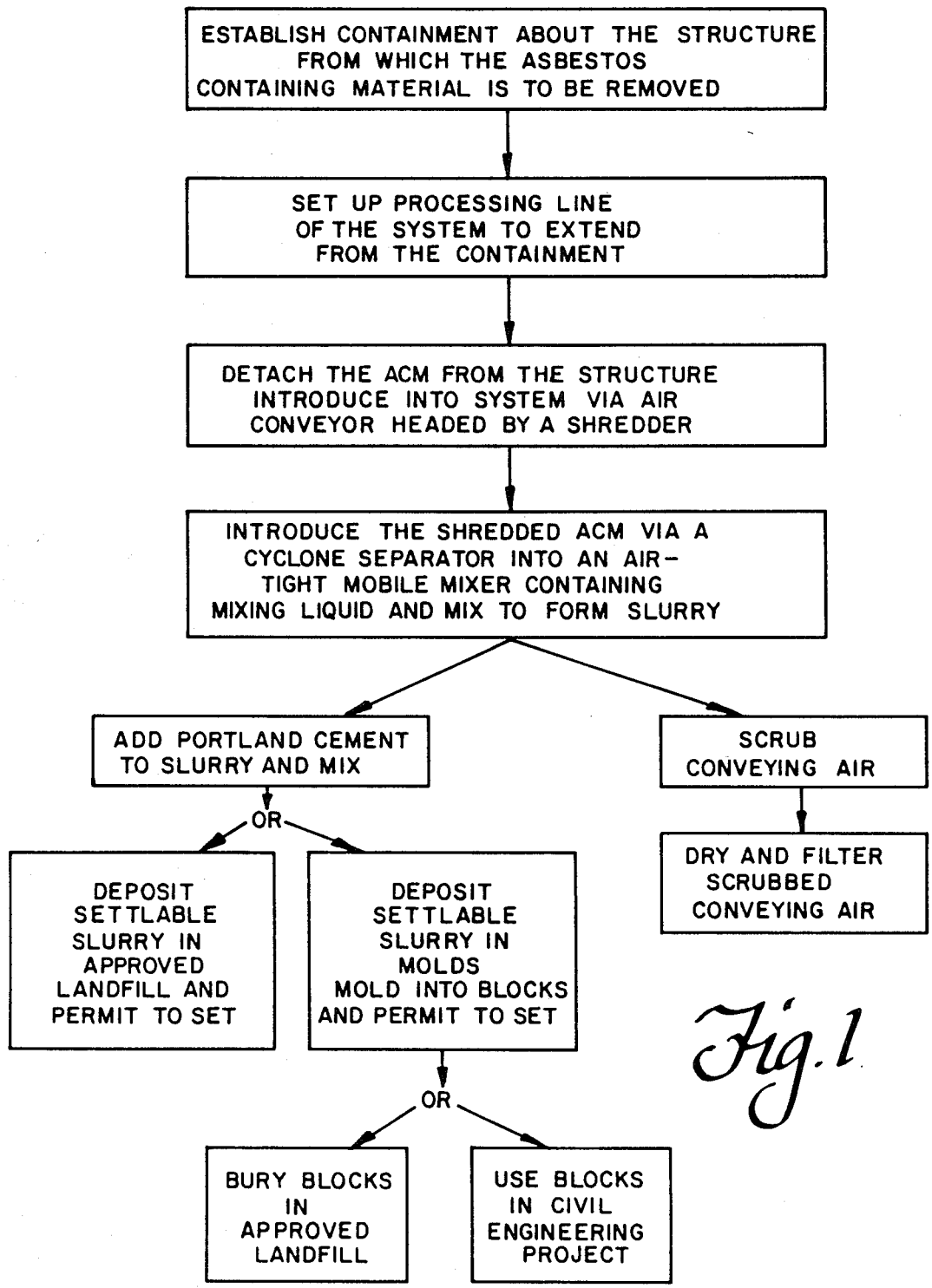
FIG. 1 is a block diagram showing a succession of steps conducted in a preferred practice of the present invention.
Figure 2A:
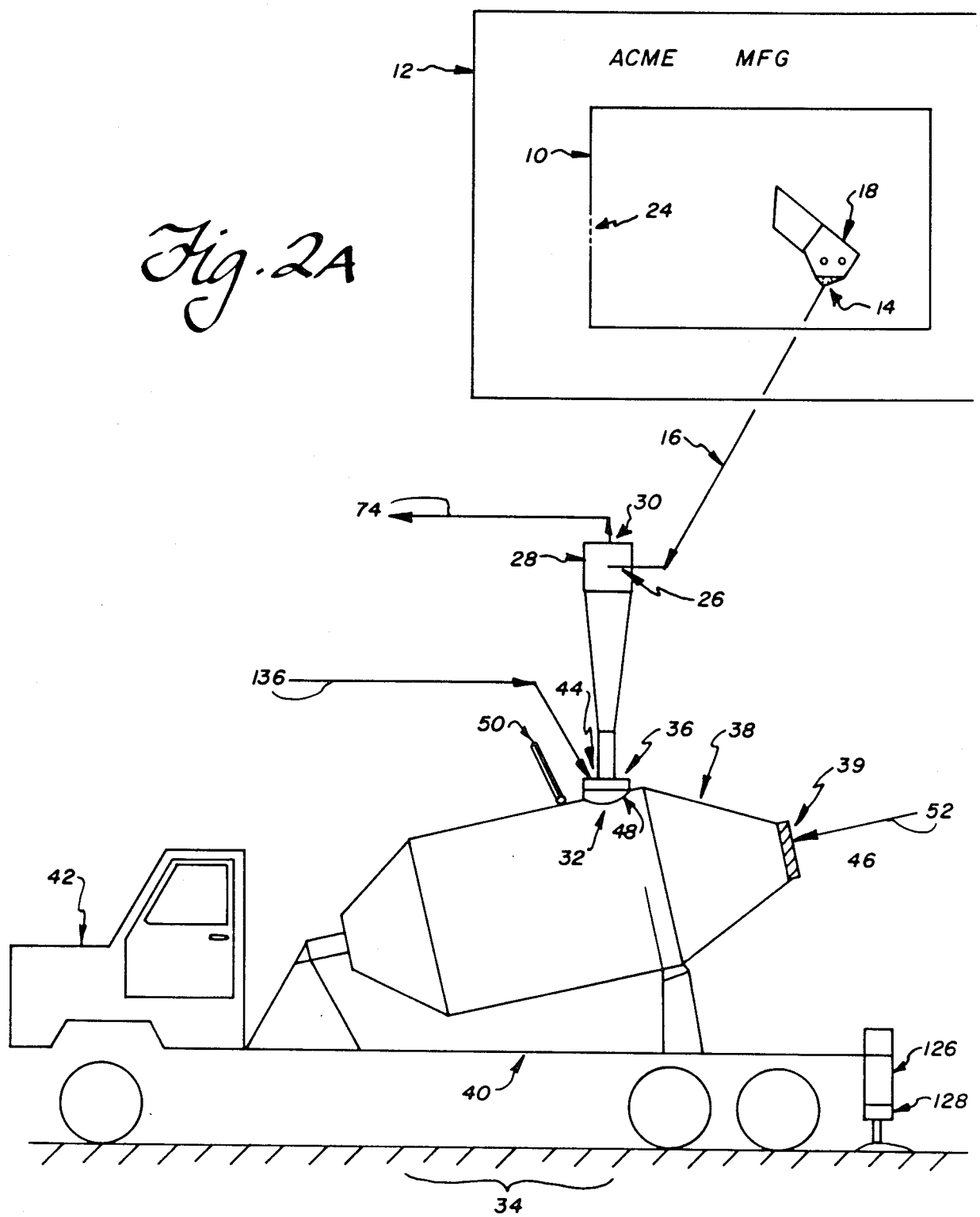
FIG. 2 shows, in schematic form, a system for practicing the temporally-central portion of the process of the present invention.
Figure 2C:
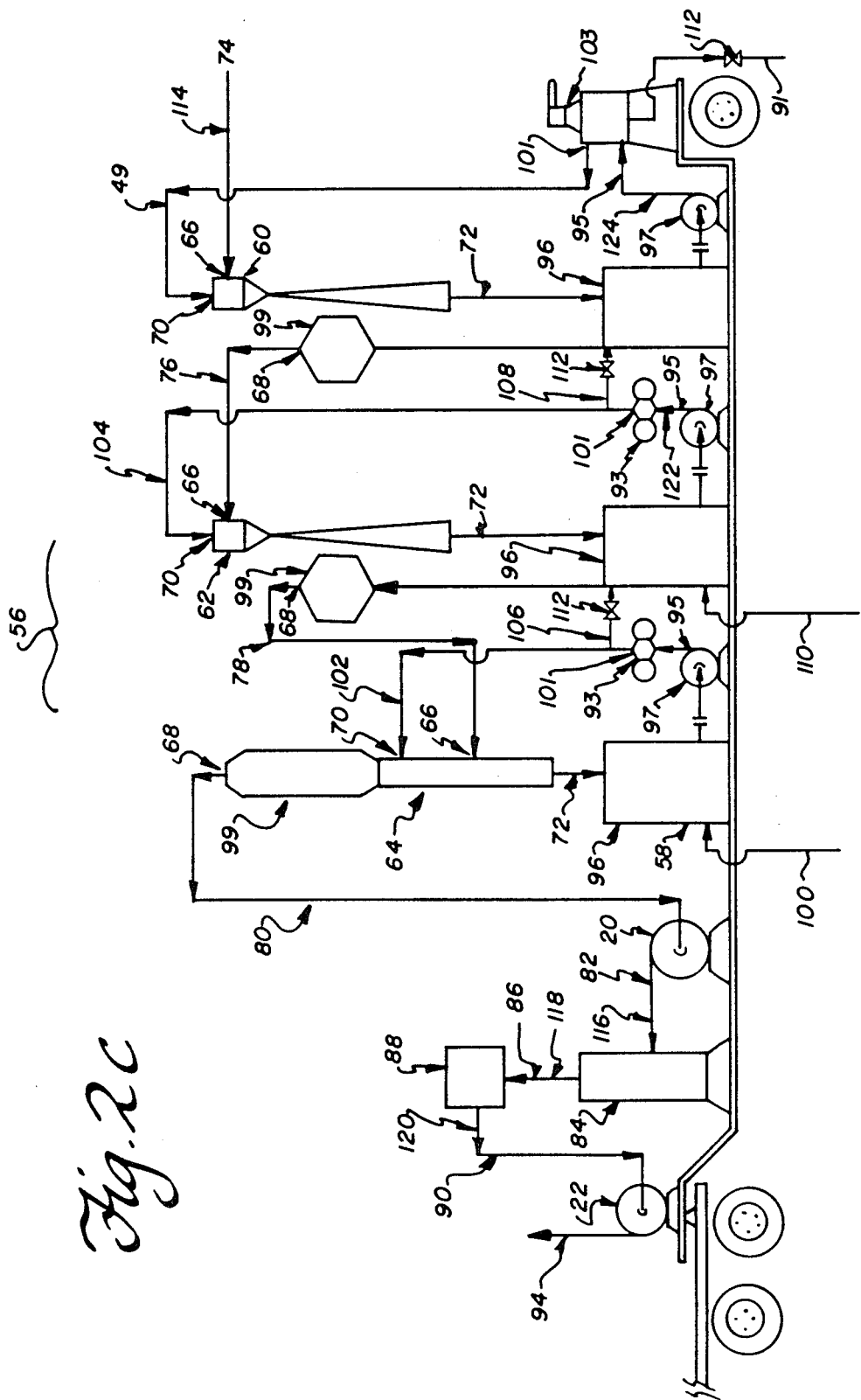

A block-diagram showing a preferred practice of the process of the present invention is provided in FIG. 1, and a processing line for conducting the middle phase of the process is shown in FIG. 2.

Referring to FIG. 2, in practicing the process in its preferred form, a containment 10 is provided which encloses or establishes an enclosed exit path from the building or other structure 12 from which the asbestos-containing material ("ACM") is to be removed.

The containment may be established in a conventional, approved manner, such as is set forth in OSHA 1926.58.

The ACM is then deconstructed from the structure (detached, separated) in a conventional, approved manner, such as is set forth in OSHA 1926.58.

The detached ACM in its as-detached state likely contains chunks and pieces too heavy and/or too large to be effectively air-conveyed, whereas the preferred mode, according to the present invention, for conveying the ACM to a mobile mixer, is an air-conveying line. Accordingly, for such instances, the upstream or head end 14 of an air-conveying line 16 that is contiguous to the containment 10, is provided with a shredder 18.

A suitable shredder is the Vactagon VIS-310. In addition to or in place of a shredder, a grinder, crusher and/or similar comminution means may be provided.

The air-conveying line 16 typically is a six-inch diameter PVC pipeline having a wall-thickness of ¼-inch. A suitable pipeline is schedule 40 PVC including connectors, if necessary, obtainable from Mid-America of Dallas, Texas, and installed in accordance with instructions provided by the pipeline manufacture.

The length of the pipeline (e.g., up to about 1,000 feet) and the bulk density of the ACM are variable, from one site to another and therefore the mass-velocity of air needed for accomplishing the conveying without silting out of heavier fragments, or blocking of the line is also variable. The primary blower 20 is equipped with a variable speed driver to compensate for these varying conditions. The suction for transporting the ACM in the air-conveying line 16 is provided downstream in the system, by primary and secondary blowers 20 and 22.

A suitable primary blower is the Spencer Model 36104-B4 by Spencer Turbine Co., 600 Day Hill Road, Windsor, CT 06095.

A suitable secondary blower is the Dayton, as sold by W. W. Grainger (#7F989), Howard Street, Chicago, IL 60648.

The air inlet to the air-conveying system is provided, through the containment 10 by a valved inlet 24, which can be closed when the system is shut down. A suitable valve is described in the preamble to OSHA 1926.58.

The air-conveying line 16 extends in an airtight manner form the outlet end of the shredder 18, to the inlet 26 of a cyclone separator 28.

A suitable cyclone separator is the RES, Inc., Model M2A1 as manufactured by Longs Blow Pipe, El Dorado, AR 71730.

The cyclone separator 28, in addition to having an inlet 26 air-tightly connected with the downstream end of the air-conveying line, has an air outlet 30 and a separated solids outlet 32.

The cyclone separator is mounted in an elevated manner on a hydraulically activated arm (not shown) connected to the mobile mixer 34 and the solids outlet 32 of the cyclone separator air-tightly connected, by a special connector 36, with the inlet to the mixer drum 38 of the mobile mixer 34.

The mobile mixer 34 preferably is a truck of the type used for accepting batches of ingredients for concrete at a batching make-up facility and for mixing them before, while and after proceeding to and reaching a construction site where the concrete is to be conveyed out of the drum and poured. Typically, such mobile mixers, popularly known as concrete mixers, concrete mixer trucks or ready-mix concrete trucks, conventionally include within their barrel a ribbon-type mixer and apparatus for conveying the mixed wet concrete, as a slurry, from the barrel, e.g. alternatively via a chute or into the inlet of a concrete pump for boosting the wet concrete to a remote, often an elevated, discharge point. In some instances, concrete mixers are designed to be filled with ingredients through the same port through which they later empty the wet concrete. In other instances, concrete mixers are provided with separate inlet ports and outlet ports. Although either kind could be used in connection with the process of the present invention, the inventors present preference is to use a concrete mixer in which the cement/concrete inlet port and outlet port are the same port. The ACM inlet port is separate.

A suitable concrete mixer is the Model: RES-M1A1, McNeilus Truck and Manufacturing (Dodge Center, MN 55927), as specified by RES., Inc.

Minimal modifications are needed to the conventional concrete mixer truck in order to adapt it for use in the process of the present invention. First, it must be carefully inspected and any leaks repaired in accordance with the manufacturer's instructions, so that no air can escape from the barrel except through the inlet/-outlet.

In general, the mobile mixer 34 comprises the drum 38, including conventional gear (not shown) for rotating it, mixing its contents and for dispensing the mixed slurry therefrom, conventionally mounted on the chassis 40 of a self-propelled truck-type vehicle 42.

Figure 3:
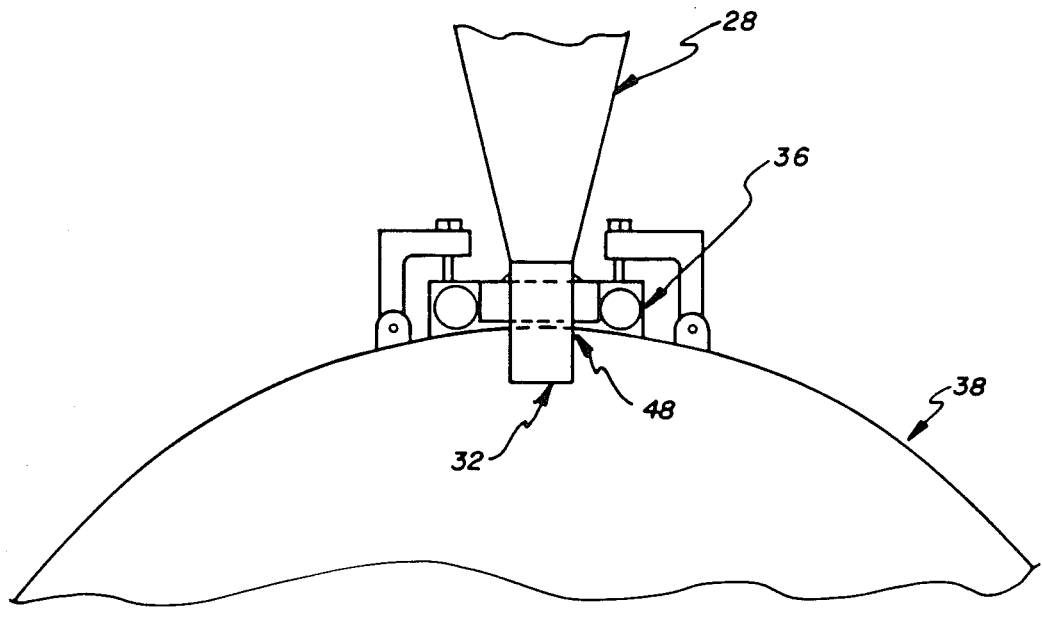
FIG. 3 is a larger-scale, fragmentary elevation view showing the special connector connecting the solids outlet of the cyclone separator and the wash-water outlet of the three-stage air scrubber, with the ingredients inlet of the mobile mixer.

The special connector 36 is shown in more detail in FIG. 3, in which its connections with the solids outlet 32 of the cyclone separator 28, with the wash-water outlet 44 of the three-stage air scrubber (yet to be described), and the rotary mixing drum 38 of the mobile mixer 34 are all illustrated. (If those practicing the present invention use cyclone separators and mobile mixers having differently-shaped or differently-oriented ports, clearly, the special connector would need to be correspondingly redesigned so as to fit, such changes being within the skill in the art.)

The connection provided at 48 between the special connector 36 and the drum 38 of the mobile mixer is a disconnectable one, the port remaining with the mobile mixer 34 including a valve or door 50 which can be closed to provide an air-tight closure for the mobile mixer so that, while in transit, and mixing, there is no reasonable likelihood of escape of asbestos from the mobile mixer.

The connection provided at 46 to allow the rotary mixer drum to be emptied is likewise provided with a valve or door 39 which can also be closed to provide an air-tight closure for the mobile mixer so that while in transit, and mixing, there is no reasonable likelihood of escape of asbestos from the mobile mixer.

Also illustrated is a conventional hopper 50 for conventional portland cement (and which may also contain, or be replicated by one or more hoppers containing, other ingredients, such as sharp sand, crushed aggregate (stone), and similar conventional ingredients of ready-mix concrete). The hopper 50 may be constructed to provide a supply of its contents (in dry, particulate, or wet slurry form, both of which are conventional), through the conventional conduit 52, by conventional pumping means (for particulate matter or slurry, as the case may be), to the inlet/outlet port 46 of the mobile mixer 34.

The mixing vessel or drum 38 of the mobile mixer has an enclosed volume of space which is not meant to be absolutely full when at capacity. For instance, in the mixer identified above, the enclosed volume is 5500 gallons, but the rated capacity is 2300 gallons.

As a preliminary to start-up of a practice of the process, the drum of the mobile mixer is partially filled with the liquid which will be used to make the slurry. At the time of a first use, this liquid may be water, e.g. from a hydrant, but in subsequent uses, it is more likely to consist, or to largely consist of amended water, i.e. used scrubber solution from the bank of air scrubbers (yet to be described), supplied through the wash-water outlet 44.

In the example under discussion, the pre-filling of liquid into the drum 38 preferably amounts to about 900 gallons (assuming that the job is big enough that, in the course of practicing the process, the truck will accumulate a full load).

The scrubbing liquid is preferably constituted by water, and a surfactant (wetting agent), preferably composed of the following ingredients:

| Ingredient | Parts (by Volume) per 100 parts water | |
|---|---|---|
| | Range | Preferred Point Value |
| ethylene glycol | 2.5–10 | 5 |
| ethylene glycol mono butylethyl ether | 10–50 | 15 |

The composition of the scrubber mixture can vary, factors into account:

A. The type of asbestos (i.e., Amosite, Chrysotile, Crocidolite, Anthophylite, Tremolite or Actinolite);
B. The % of $CaCO_3$ in the binder/filler; and
C. The moisture content of the ACM.

In the instance of an initial start-up, the solution can be made-up in the drum 38 of the mobile mixer 34. In an instance in which the drum 38 is being charged using spent wash-water from the air scrubber, the wetting agents and make-up wash-water are introduced into the system at 56, the liquid inlet to the three-stage air scrubber system 58.

As the shredder and air-conveyor system are operated, with the mobile mixer in place, having its pre-filling of solution, the cyclone separator 28 separates about ninety-nine percent of the solids content from the air stream in the air-conveyor system and deposits it, through the special connector 36, into the mixer drum 38. As the solids fall from the cyclone, they drop into the liquid in the mixer, which is operated continuously or intermittently to turn the liquid and solids mixture into a slurry.

The cement and other ingredients are added to the ACM-washing solution slurry by worm- or screw-type conveyor 52 from the hopper 50 after which the connection 36 is disconnected at 48 and the truck 42 driven to the site where the settable wet cement-containing ACM slurry is to be off-loaded. Before, while or after the trip to the off-loading site, the mixer of the truck is operated for thoroughly mixing the ingredients.

By preference, as indicated above, the mixer vessel 38 has a conventional ribbon-type mixer built into its interior. This mixer can serve both for mixing the ingredients and for discharging the cementatious wet mass from the mixer vessel 38.

A ribbon-type mixer and discharge system provides a distinct advantage over other types of mixing and transfer systems, notably including screw conveyers. In particular, it is substantially less likely to be adversely affected by the presence of tie wire, metal lath, nuts and bolts and other similar likely ingredients of much ACM.

As convenient, or when the mixer has received a predetermined amount of ACM, introduction of ACM into the shredder and air-conveyor is shut down and, after the air conveyor has become cleared of ACM, it is shut down by shutting down the primary and secondary blowers 20 and 22. The air scrubbers are idled as well.

A way that one may satisfactorily monitor how much ACM should be added to a given amount of liquid in the mixer, how much has been added up to any particular time, and when a full complement has been reached, is as follows: the mobile mixer 34 is equipped with hydraulic leveling jacks 126 which have incorporated into them load cells 128. The digital read-out from the load cells provides real-time indication of the amount of material in the mobile mixer 34 at all times.

Just before the mobile mixer, bearing its full complement of ACM slurry leaves for the landfill o other site where the ACM slurry is to be unloaded, cement (and, as mentioned above, sand and/or other ingredients, if desired) are added. The following are examples of cement-containing ACM produced in accordance with the present invention:

EXAMPLE 1

| Ingredient | Amount |
|---|---|
| ACM | 26,000 pounds |

-continued

| Ingredient | Amount |
|---|---|
| wetting liquid (including 100 parts water, 5 parts ethylene glycol and 5 parts ethylene glycol mono butylethyl ether) | 2,000 gallons |
| portland cement | 6,000 pounds |

In the foregoing example, the ACM was material removed from a paper mill steam piping. It was mostly made up of Amosite, binders and filler. The approximate proportions of its constituents were Amosite 60%, $Na_2SiO_3$ 10%, and fly ash/sand/clay 30%. The range of particle sizes in the ACM was not possible to determine. (Because of the nature of the amosite material (monoclinic crystals) which tend to blind the screens, a sieve analysis of this material would be very suspect.)

EXAMPLE 2

| Ingredient | Amount |
|---|---|
| ACM | 22,000 pounds |
| wetting liquid (including 100 parts water, 15 parts ethylene glycol and 5 parts ethylene glycol mono butylethyl ether) | 2,000 gallons |
| portland cement | 4,000 pounds |
| sand (20 mesh) | 4,000 pounds |

In the foregoing example, the ACM was material removed from a boiler penthouse. It was mostly made up of asbestos contaminated fly ash. The approximate proportions of its constituents were fly ash and soot 60%, dirt and clay 10%. The range of particle sizes in the ACM was approximately as follows:
5% would pass through a No. 400 sieve
10% would pass through a No. 100 sieve
15% would pass through a No. 25 sieve
20% would pass through a No. 5 sieve
100% would pass through a $\frac{7}{8}''$ sieve

EXAMPLE 3

| Ingredient | Amount |
|---|---|
| ACM | 24,000 pounds |
| wetting liquid (including 100 parts water, 10 parts ethylene glycol and 5 parts ethylene glycol mono butylethyl ether) | 2,500 gallons |
| portland cement | 3,000 pounds |
| fly ash | 2,000 pounds |
| sand | 4,000 pounds |
| gravel | 2,000 pounds |

In the foregoing example, the ACM was material removed from a carbon plant. It was mostly made up of heat exchanger insulation. The approximate proportions of its constituents were chrysotile 30%, $CaCO_3$ 20%, clay 40%. The range of particle sizes in the ACM was approximately as follows:
5% would pass through a No. 200 sieve
10% would pass through a No. 100 sieve
15% would pass through a No. 25 sieve
80% would pass through a No. 5 sieve
100% would pass through a $\frac{1}{4}''$ sieve In each case, the wet cement-containing ACM slurry was suitable for land-filling and for block-making.

At the off-loading site, whether a landfill or a block manufactory, the mobile mixer may be self-unloaded substantially in the same way as it would be were it carrying a load of wet ready-mix concrete, and permitted to harden in a polyethylene sheeting-lined pit, or in block molds (and then removed from the molds), substantially as if it were conventional concrete.

Preferred disposition of the portland cement-containing ACM slurry mixture includes, without limitation, the following:

A. The mass can be discharged into a polyethylene sheeting-lined pit at a landfill site that has been approved to receive and dispose the particular material, whether that site belongs to the entity from whose building the ACM was removed, or a third party, and B. The mass can be discharged into disposable or reusable forms to yield solid blocks of cementatious material which can be used in several ways, including, without limitation:
 1. burying in a landfill, and
 2. used in a civil engineering construction project, such as a riverbank stabilization project or an artificial reef construction project.

The detailed description now returns to the point in the process where the air-conveying air is separated from the conveyed ACM at the cyclone separator 28, to further explain what happens to the separated air stream, and how the wash-water reaches the outlet 44.

The air scrubber system 56 includes at least one and preferably a series of a plurality of air scrubbers, a first stage scrubber 60, a second stage scrubber 62 and a third stage scrubber 64 being illustrated.

Each scrubber 60, 62, 64 has an air inlet 66, an air outlet 68, a liquid inlet 70 and a liquid outlet 72.

A conduit 74 connects the air outlet 30 of the cyclone separator 28 with the air inlet of the first stage scrubber 60. A conduit 76 connects the air outlet 68 of the first stage scrubber with the air inlet of the second stage scrubber 62, a conduit 78 connects the air outlet 68 of the second stage scrubber with the air inlet of the third stage scrubber, and a conduit 80 connects the air outlet 68 of the third stage scrubber with the suction side of the primary blower 20. A conduit 82 connects the outlet side of the primary blower 20 with the inlet side of a bank of primary filters 84, a conduit 86 connects the outlet side of the bank of primary filters 84 with the inlet side of a bank of HEPA filters 88 with the suction side of the secondary blower 22, and a conduit 94 exhausts from the exit side of the secondary blower 22. Depending on the physical arrangement of the abatement site, the conduit 94 may be open to the atmosphere, or it may recycle back to the inlet 24 to the containment 10.

Washing solution make-up for the bank of scrubbers is provided at 58, as indicated previously.

Each scrubber 60, 62 and 64 has a separator/reservoir 96. The scrubbers 60, 62 and 64 each mount directly on to their respective separator/reservoirs.

Also mounted directly to each separator/reservoir is a chevron/knitted mesh mist eliminator 99.

Also mounted directly to each separator/reservoir 96 is a centrifugal pump 97.

A conduit 95 connects each pump 97 to an inline strainer. The first stage scrubber 60 is equipped with a self-cleaning strainer 103. Second and third stage scrubbers 62 and 64 are equipped with dual cartridge strainers 93. The strainers are connected to the scrubber inlets 70.

A conduit 100 connects the washing solution make-up facility with the washing liquid inlet 58 of the third stage separator/reservoir 96; a conduit 102 connects the washing liquid from the strainer 93 to the third stage scrubber 64 wash water inlet 70; a conduit 104 connects the washing liquid from the strainer 93 to the second stage scrubber 62 wash water inlet 70; a conduit 49 connects the Washing water from the strainer 103 outlet 101 to the first stage scrubber 60 wash water inlet 70; a conduit 91 connects the dirty wash water outlet of the self cleaning strainer 103 to the external settling clarifier 132.

Connected directly to the external settling clarifier 132 is a sludge pump 134. A conduit 136 connects the pump 134 to the water inlet 44 of the rotary mixer drum 38 on the mobile mixer 34.

Connected directly to the external settling clarifier is wash water recycle pump 138. A conduit 110 connects wash water recycle pump 138 to the second stage scrubber separator/reservoir 96.

In addition, the conduit 102 has a branch 106 which recycles to the separator/reservoir 96 of the first stage scrubber 60. Valves 112 provided at the upstream ends of the branches 106, 108 and 110 are operable for determining whether and to what extent the washing liquid is recycled to the same scrubber or forwarded up the line to the preceding scrubber. Valve 112 on the upstream end of conduit 91 determines the amount o dirty scrubber liquid which is forwarded to the external settling/clarifier 132.

As non-limitative examples, the following equipment may be used in the conveying-air clean-up unit:

The third stage 64 air scrubber is a Catenary Grid scrubber by Chem-Pro, P.O. Box 3100, Parsippany, NJ 07054.

The second stage 62 air scrubber is a Schutte and Koerting 12 Model 7010 by Ametek, S&K Division, Cornwells Heights, PA. 19020.

The first stage 60 air scrubber is a Schutte and Koerting 12" Model 7010 by Ametek, S&K Division, Cornwells Heights, PA 19020.

The primary air blower 20 is a Spencer Model 36104-B4 by Spencer Turbine Company, 600 Day Hill Road, Windsor, CT 06095.

The secondary air blower 22 is a Dayton, as sold by W. W. Grainger (#7F989), Howard Street, Chicago, IL 606648.

The primary air filter bank 84 is made-up of 4 or 6 bag type, 95% efficiency, 24" by 24" filters, as sold by W. W. Grainger, Inc. #3W336, Howard Street, Chicago, IL 60648.

"HEPA" is an acronym for High Efficiency Particle Air. The HEPA filter bank 88 is made-up of two 24" by 24" by 11¼" HEPA filters in parallel, as manufactured by Delta Filters, Watervelett, NY.

The strainer 93 is a Hayward Duplex or twin basket strainer and the self cleaning strainer 103 is a Hayward self-cleaning pipeline strainer by Hayward Strainers, Inc., 900 Fairmont Ave., Elizabeth, NJ 07207.

The conduits for the air side of the conveying air clean-up system are stainless steel "blow pipe" type ducts 6" to 12" in diameter.

The conduits for the liquid side of the conveying air clean-up system are 2" and 3" schedule 40 stainless steel pipe and fittings.

During extended use the first and second stage scrubbers in the example under discussion use 165 gallons per minute of washing liquid as the scrubbing medium. The third stage scrubber uses 30 gallons per minute of washing liquid. As the liquid becomes loaded with solids, fresh wash liquid is made-up at the make-up facility and introduced into the system at the liquid inlet to the third stage scrubber. The valving of the system is then operated to forward contaminated liquid up the line to the drum of the mobile mixer. Either this replacement operation can be conducted at the beginning of each cycle, i.e. when an empty truck is connected to the system, or else, if needed, it can be conducted at any intermediate point in a cycle, as needed. In such cases, the determinations of when and how much liquid to forward to the mixer and replace are made as follows: a sample of the third stage scrubber solution is drawn and checked for contamination (solids). Enough solution is pumped forward and new added to maintain less than 1% solids. Ultimately that amount of slurry from the clarifier 132 is pumped to the mobile mixer.

In steady state operation, the pressure in the air side of the system at selected points 114, 116, 118 and 120 is 12.4 psia, 14.6 psia, 14.5 psia and 14.4 psia, respectively, and the pressure in the liquid side of the system at selected points 122 and 124 is 150 psig and 155 psig, respectively.

The conveying air leaving the cyclone separator and entering the first stage of the air scrubbers typically contains about one percent solids.

The scrubbers 60 and 62 are preferably a venturi-type wet scrubber having a separator/reservoir and a circulation pump. The third stage scrubber 64 is preferably a catenary grid scrubber.

The air stream issuing from the third stage of the air scrubber series, in steady state operation, typically has the following attributes:
2,000 cubic feet/minute
90° F. temperature
100% relative humidity
12.6 psia pressure
<0.01% solids content (by weight)

(Because the air stream contains s little asbestos at this point, even a catastrophic breakdown of the filters would not expose workers or others to a significant hazard.)

The relatively clean conveying air stream is pushed and drawn through the filter banks by the blowers. The secondary blower is operated to ensure that the filter assemblies remain under negative pressure at their downstream ends. The primary filters may actually consist of a first series of primary filters, having a 95 percent ASHRAE rating, and a second series of secondary filters having a 99.5 percent ASHRAE rating. The HEPA filters typically have a 99.997 percent ASHRAE rating (removing particles down to 0.3 microns). (ASHRAE is an acronym for American Society of Heating, Refrigeration and Air Conditioning Engineers.)

The primary blower typically is a 2000 cubic feet per minute turbine-type blower. Use of a turbine-type blower is preferred for two reasons, namely, this type of blower can handle the solids which may still be carried by the air stream at this stage, and a significant portion of the energy put into this type of blower is transferred to the air stream causing heating of the air stream. It is highly desirable that the air stream be heated at this stage, in order to ensure substantially complete vaporization of liquid in the air stream, since free moisture droplets of any size will rapidly ruin HEPA filters. Typically, the air stream inlet temperature to the first stage blower is 90° F. and the air stream outlet temperature from the first stage blower is 140° F.

The air stream issuing from the secondary blower, in steady state operation of the process, typically has the following attributes:
2200 cubic feet/minute
140° F. temperature
70% relative humidity
14.9 psia pressure
<0.003% solids content (by weight)

Of the solids content issuing from the secondary blower, a typical analysis is as follows:
asbestos: none detectable by OSHA procedure 7300
$CaCO_3$: 1 to 10 percent
$CaSio_2$: 1 to 30 percent
cellulose: 1 to 70 percent
balance (mostly clay and dirt): to equal 100% by weight It is contemplated that much or all of the system, beyond the containment 10 can be truck- or trailer-mounted for ease of transportation from site to site.

It should now be apparent that the method and apparatus for disposing of asbestos-containing material as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A method for disposing of solid material containing a hazardous substance, comprising:
   establishing a containment about a structure or other formation which bears the hazardous substance;
   providing a mobile mixer;
   establishing an air-solids separating device having a solids outlet in disconnectable connection with an inlet to the mobile mixer;
   establishing an air-conveying line extending out of the containment, to an inlet of the air-solids separating device;
   establishing an air scrubber bank having an air stream inlet, an air stream outlet, a scrubbing liquid inlet and a scrubbing liquid outlet;
   connecting an air stream outlet of the air-solids separating device with the air stream inlet of the air scrubber bank
   while supplying scrubbing liquid to said scrubbing liquid inlet:
      pumping a suction on said air stream outlet of said air scrubber bank
      separating quanta of said solid material from said structure or other formation and feeding such quanta out of said containment to said air-solids separating device via an air stream in said air-conveying line, and
      operating said air-solids separating device to separate most of said quanta from said air stream and deposit such separated quanta in said mobile mixer;
   adding a slurrying liquid to said mobile mixer containing said separated quanta and operating said mixer to mix said separated quanta and said slurrying liquid, to form a slurry;
   adding a settable setting agent to said slurry in said mixer and operating said mixer to mix said slurry with said settable setting agent, to form a settable slurry;
   disconnecting said mobile mixer and driving said mobile mixer to a site remote from said structure or other formation; and
   expelling said settable slurry from said mobile mixer at said remote site and permitting said settable slurry to set so as to form at least one block in which said hazardous substance has become trapped by the setting of said settable setting agent.

2. The method of claim 1, wherein:
said mobile mixer is a ready-mix concrete truck.

3. The method of claim 2, wherein:
said ready-mix concrete truck provides a rotatable mixing vessel, having a ribbon-type mixer, and in which said separated quanta, said slurrying liquid and said settable setting agent are mixed by said ribbon-type mixer.

4. The method of claim 3, wherein:
said settable slurry is expelled from said rotatable mixing vessel by operating said ribbon-type mixer.

5. The method of claim 1, wherein:
said air-solids separating device is a cyclone separator.

6. The method of claim 1, further including:
size-reducing said solid material after separating it from said structure or other formation, before it reaches said air-solids separating device.

7. The method of claim 6, wherein:
said solid material is size-reduced by running it through a shredder provided at an upstream end of said air-conveying line.

8. The method of claim 1, wherein:
said air scrubber bank includes a first-, a second- and a third-stage air scrubber, provided in series.

9. The method of claim 1, wherein
said scrubbing liquid supplied to said scrubbing liquid inlet of said air scrubber bank is a mixture of water and at least one wetting agent.

10. The method of claim 9, wherein:
said at least one wetting agent comprises ethylene glycol and ethylene glycol monobutylether.

11. The method of claim 9, wherein:
said slurrying liquid comprises spent scrubbing liquid from said liquid outlet of said air scrubber bank.

12. The method of claim 1, wherein:
said settable setting agent comprises portland cement.

13. The method of claim 12, wherein:
at said remote site, said mobile mixer is discharged of said settable slurry into a prepared pit.

14. The method of claim 13, wherein:
said hazardous material is asbestos.

15. The method of claim 1, wherein:
at said remote site, said mobile mixer is discharged of said settable slurry into a prepared pit.

16. The method of claim 15, wherein:
said hazardous material is asbestos.

17. The method of claim 12, wherein:
at said remote site, said mobile mixer is discharged of said settable slurry into a plurality of block molds.

18. The method of claim 17, wherein:
said hazardous material is asbestos.

19. The method of claim 1, further including:

establishing at least one bank of air filters in said air stream downstream of said air scrubber bank and upstream of at least one suction blower for filtering before discharging said air stream.

20. The method of claim 19, further including:
establishing at least one air stream heater in said air stream downstream of said air scrubber bank and upstream of at least on said bank of air filters.

21. The method of claim 20, wherein:
said at least one air stream heater comprises a turbine-type suction blower and said at least one bank of air filters includes a bank of HEPA filters.

22. Apparatus for disposing of solid material containing a hazardous substance located in a structure or other formation, comprising:
a containment established about said structure or other formation which bears the hazardous substance;
a mobile mixer;
an air-solids separating device having a solids outlet in disconnectable connection with an inlet to the mobile mixer;
an air-conveying line extending out of the containment, to an inlet of the air-solids separating device;
an air scrubber bank having an air stream inlet, an air stream outlet, a scrubbing liquid inlet and a scrubbing liquid outlet;
air stream outlet of the air-solids separating device connecting with the air stream inlet of the air scrubber bank,
so that, while supplying scrubbing liquid to said scrubbing liquid inlet:
a suction may be pumped on said air stream outlet of said air scrubber bank
quanta of said solid material may be separated from said structure or other formation and feeding such quanta out of said containment to said air-solids separating device via an air stream in said air-conveying line, and
said air-solids separating device may be operated to separate most of said quanta from said air stream and deposit such separated quanta in said mobile mixer; a slurrying liquid may be added to said mobile mixer containing said separated quanta and said mixer operated to mix said separated quanta and said slurrying liquid, to form a slurry; a settable setting agent may be added to said slurry in said mixer and operating said mixer to mix said slurry with said settable setting agent, to form a settable slurry; said mobile mixer may be disconnected and driven to a site remote from said structure or other formation; and said settable slurry may be expelled from said mobile mixer at said remote site and permitting said settable slurry to set so as to form at least one block in which said hazardous substance has become trapped by the setting of said settable setting agent.

23. The apparatus of claim 22, wherein:
said mobile mixer is a ready-mix concrete truck.

24. The apparatus of claim 23, wherein:
said ready-mix concrete truck provides a rotatable mixing vessel, having a ribbon-type mixer in which said separated quanta, said slurrying liquid and said settable setting agent can be mixed by said ribbon-type mixer.

25. The apparatus of claim 22, wherein:
said air-solids separating device is a cyclone separator.

26. The apparatus of claim 22, further including:

means for size-reducing said solid material after separating it from said structure or other formation, before it reaches said air-solids separating device.

27. The apparatus of claim 26, wherein:
said size-reducing means comprises a shredder provided at an upstream end of said air-conveying line.

28. The apparatus of claim 22, wherein:
said air scrubber bank includes a first-, a second- and a third-stage air scrubber, provided in series.

29. The apparatus of claim 22, further including:
means for supplying said scrubbing liquid to said scrubbing liquid inlet of said air scrubber bank as a mixture of water and at least one wetting agent.

30. The apparatus of claim 29, further including:
means for supplying said slurrying liquid as spent scrubbing liquid from said liquid outlet of said air scrubber bank.

31. The apparatus of claim 22, further including:
at least one bank of air filters in said air stream downstream of said air scrubber bank and upstream of at least one suction blower for filtering before discharging said air stream.

32. The apparatus of claim 31, further including:
at least one air stream heater in said air stream downstream of said air scrubber bank and upstream of at least one said bank of air filters.

33. The apparatus of claim 32, wherein:
said at least one air stream heater comprises a turbine-type suction blower and said at least one bank of air filters includes a bank of HEPA filters.

34. A method for disposing of solid material containing a hazardous substance, comprising:
establishing a containment about a structure or other formation which bears the hazardous substance;
providing a mixer;
establishing an air-solids separating device having a solids outlet in disconnectable connection with an inlet to the mixer;
establishing an air-conveying line extending out of the containment, to an inlet of the air-solids separating device;
establishing an air scrubber bank having an air stream inlet, an air stream outlet, a scrubbing liquid inlet and a scrubbing liquid outlet;
connecting an air stream outlet of the air-solids separating device with the air stream inlet of the air scrubber bank
while supplying scrubbing liquid to said scrubbing liquid inlet:
pumping a suction on said air stream outlet of said air scrubber bank
separating quanta of said solid material from said structure or other formation and feeding such quanta out of said containment to said air-solids separating device via an air stream in said air-conveying line, and
operating said air-solids separating device to separate most of said quanta from said air stream and deposit such separated quanta in said mixer;
adding a slurrying liquid to said mixer containing said separated quanta and operating said mixer to mix said separated quanta and said slurrying liquid, to form a slurry;
adding a settable setting agent to said slurry in said mixer and operating said mixer to mix said slurry with said settable setting agent, to form a settable slurry; and
expelling said settable slurry from said mixer and permitting said settable slurry to set so as to form at least one block in which said hazardous substance has become trapped by the setting of said settable setting agent.

\* \* \* \* \*